United States Patent
Heston et al.

(10) Patent No.: US 11,486,379 B2
(45) Date of Patent: Nov. 1, 2022

(54) SELF-REGULATING BIMETALLIC DIAPHRAGM PUMP

(71) Applicant: Cal Poly Corporation, San Luis Obispo, CA (US)

(72) Inventors: Nathan Clark Heston, San Luis Obispo, CA (US); Joseph Daniel Zuchegno, Denver, CO (US); Stephen Ford Heston, Denver, CO (US); Maureen Najua Smith, Fremont, CA (US)

(*) Notice: Subject to any disclaimer, the term of this patent is extended or adjusted under 35 U.S.C. 154(b) by 1 day.

(21) Appl. No.: 17/020,278

(22) Filed: Sep. 14, 2020

(65) Prior Publication Data

US 2021/0079910 A1   Mar. 18, 2021

Related U.S. Application Data

(60) Provisional application No. 62/899,728, filed on Sep. 12, 2019.

(51) Int. Cl.
| | |
|---|---|
| *F04B 43/00* | (2006.01) |
| *F04B 43/02* | (2006.01) |
| *F16J 3/02* | (2006.01) |
| *F04B 43/06* | (2006.01) |

(52) U.S. Cl.
CPC ........ *F04B 43/0054* (2013.01); *F04B 43/009* (2013.01); *F04B 43/02* (2013.01); *F04B 43/06* (2013.01); *F16J 3/02* (2013.01)

(58) Field of Classification Search
CPC .... F04B 43/0054; F04B 43/009; F04B 43/06; F04B 43/02; F16J 3/02
See application file for complete search history.

(56) References Cited

U.S. PATENT DOCUMENTS

| | | | |
|---|---|---|---|
| 2,867,224 A | 1/1959 | Martiniak et al. | |
| 3,152,554 A | 10/1964 | Kofink | |
| 3,606,592 A | 9/1971 | Madurski et al. | |
| 4,551,978 A | 11/1985 | O'Hare | |
| 4,636,149 A | 1/1987 | Brown | |
| 4,646,523 A | 3/1987 | O'Hare | |

(Continued)

FOREIGN PATENT DOCUMENTS

| | | |
|---|---|---|
| EP | 1500863 B1 | 8/2008 |
| WO | WO2010115667 A1 | 10/2010 |

OTHER PUBLICATIONS

J. Zou et al., A Novel Thermally-actuated Silicon Micropump, 1997 International Symposium on Micromechatronics and Hman Science, Jun. 1997, pp. 231-234.

(Continued)

*Primary Examiner* — Peter J Bertheaud

(57) ABSTRACT

A system, method apparatus including a bimetallic mechanical pump diaphragm for fluid handling including two walls forming a chamber divided by a snap-acting bimetallic mechanical diaphragm which uses the rapid, concavity inversing, buckling transition of the diaphragm pump fluid as thermal energy in a first fluid is converted to mechanical energy to push a second fluid as the diaphragm moves from a first position to a second position in the chamber. Two sets of inlet and outlet passageways include one way valves to control the flow of the first and second fluids having different temperatures.

11 Claims, 5 Drawing Sheets

(56) References Cited

U.S. PATENT DOCUMENTS

| | | | |
|---|---|---|---|
| 6,039,262 | A | 3/2000 | DeAnna |
| 6,100,094 | A | 8/2000 | Tajima |
| 6,640,646 | B2 | 11/2003 | Davis et al. |
| 6,725,813 | B1 | 4/2004 | Boyer |
| 8,820,315 | B2 | 9/2014 | Jackman |
| 8,888,471 | B2 * | 11/2014 | Nitta ............... F04B 43/046 417/413.2 |
| 9,400,122 | B2 | 7/2016 | Kim et al. |
| 9,541,307 | B2 | 1/2017 | Jackman |
| 2017/0074256 | A1 | 3/2017 | Banko |

OTHER PUBLICATIONS

Sandeep, O.S. et al., Design and Development of a Bi-Metallic Based Micro Pump, International Journal of Research in Mechanical Engineering vol. 2, Issue-1, Jan.-Feb. 2014, pp. 38-42.

Thermostatic Bimetal Designer's Guide, brochure from Engineered Materials Solutions, Wickeder Group, Oct. 2018, 50 pages.

J. Jumeau, Introduction to thermostats technology, Ultimheat University, Oct. 30, 2012, 28 pages.

Adem Caliskan et al., The characterisation of bimetal disks used for thermostatic control and over-temperature protection, The Online Journal of Science and Technology—Oct. 2017 vol. 7, Issue 4, pp. 206-213.

J. Boughaleb et al., Design and performance benchmark of various architectures of a piezoelectric bimetallic strip heat engine, Optical Materials 56, Jan. 12, 2016, pp. 110-115.

A. Arnaud et al., Harvesting heat with thermo-mechanically bistable beams: working principle and theoretical performances, Opt Quant Electron, Feb. 10, 2016, 48:184, DOI 10.1007/s11082-016-0431-3, 7 pages.

A Arnaud et al, Thermo-mechanical efficiency of the bimetallic strip heat engine at the macro-scale and microscale, Journal of Micromechanics and microengineering 25, Sep. 24, 2015, 14 pages.

S.K.T. Ravindran et al., Analysis of a bimetallic micro heat engine for energy harvesting, Smart Materials and Structures 23, Feb. 10, 2014, 14 pages.

O. PUSCASU et al., Flexible bimetal and piezoelectric based thermal to electrical energy converters, Sensors and Actuators A: Physical, Mar. 29, 2014, pp. 7-14.

E.G. Loukaides et al., Magnetic actuation and transition shapes of a bistable spherical cap, International Journal of Smart and Nano Materials, 2014 vol. 5, No. 4, Jan. 22, 2015, pp. 270-282.

Shiangyu Lin et al., Bio-MEMS Thermally-Actuated Micropump, ASEE 2014 Zone I Conference, Apr. 3-5, 2014, 6 pages.

Ziga Gosar et al., Experimental Analysis of Kinematics of Snap-Through of the Shallow Axisymmetric Parabolic Bimetallic Shell, International Journal of Basic & Applied Sciences IJBAS-IJENS vol. 13 No. 04, Aug. 2013, pp. 23-29.

A.Arnaud et al., Piezoelectric and electrostatic bimetal-based thermal energy harvesters, Journal of Physics: Conference Series 476, 2013, 6 pages.

S.K.T. Ravindran et. al., A Bimetallic Micro Heat Engine for Pyroelectric Energy Conversion, Procedia Engineering 47, Sep. 9-12, 2012, pp. 33-36.

A. Brinkmeyer et. al., Pseudo-Bistable Self-Actuated Domes for Morphing Applications, International Journal of Solids and Structures, Jan. 9, 2012, 41 pages.

F. Abhari et al., A Comprehensive Study of Micropumps Technologies, International Journal of Electrochemical Sciences 7, Oct. 1, 2012, pp. 9765-9780.

Marko Jakomim, Shallow Axi-symmetric Bimetallic Shell as a Switching Element in a Non-Homogenous Temperature Field, Engineering, 2011, 3, Feb. 2011, pp. 119-129.

C. Ucke et al., Revival of the Jumping Disc, Physics Education, 2009, 5 pages.

M. Jakomin et al., Buckling of a shallow rectangular bimetallic shell subjected to outer loads and temperature and supported at four opposite points, Advances in Mechanical Engineering, vol. 2009, Article ID 767648, 2009, 17 pages.

Y. Wang, Bifurcations and chaos of bimetallic circular plates subjected to periodic heat load, Journal of Applied Mathematics and Mechanics 88, No. 4, 2008, pp. 256-266.

Kanthal Thermostatic Bimetal handbook, catalog from Kanthal AB, 2008, 136 pages.

M. Batista et al., Thermoelastic stability of bimetallic shallow shells of revolution, International Journal of Solids and Structures 44, 2007, pp. 447-464.

A.H. Sofiyev, Thermoelastic stability of functionally graded truncated conical shells, Composite Structures 77, 2007, pp. 56-65.

M. Sathe, A graduate student thesis, Design fabrication and thermomechanical testing of a vertical bimorph sensor in the wafer plane, Department of Mechanical Engineering, Louisiana State University and Agricultural and Mechanical College, Dec. 2004, 133 pages.

N.N. Kryukov et al., Axisymmetric deformation of bimetallic shells of revolution in the supercritical region, Journal of Mathematical Sciences, vol. 71, No. 4, 1994, pp. 2577-2580.

V.N. Khudik et al., Thermal deformation of a bimetallic disk, Institute of Computational Technology, Siberian Branch, Russian Academy of Sciences, Novosibirsk, Russia, translated from Prikladnay Mekhanika, vol. 29, No. 8, Aug. 1993, pp. 61-68.

J.W. Eischen et al., Realistic Modeling of Edge Effect Stresses in Bimaterial Elements, Transactiona of the ASME, vol. 112, Mar. 1990, pp. 16-23.

Cyril Isenberg, The Jumping Disc, Physics Education 22, 1987, pp. 158-159.

Liu Ren-Huai, Non-linear thermal stability of bimetallic shallow shells of revolution, International Journal of Non-Linear Mechanics, vol. 18, No. 5, 1983, pp. 409-429.

W.C. Hu, An Investigation into Switching Behaviors of Bimetallic-Disk Thermostats, Space and Missile Systems Organization, Air Force Systems Command, SAMSO-TR-78-18, 1978, 55 pages.

M.S. Mikhalishin et al., Theory of limit equilibrium of bimetallic shells of revolution and circular plates, Novosibirsk, Ternopol, translated from Prikladnoi Mekhaniki i Tekhnicheskoi Fiziki, No. 2, Mar.-Apr. 1974, pp. 139-151.

Robert Cutler, Inventors by Accident, Modem Mechanix, Feb. 1950, 5 pages, downloaded from http://blog,modernmechanix.com/inventors-by-accident/.

E.I. Grigolyuk et al., State of the art of the theory of multilayer shells, Moscow Aviation Institute, translated from Prikladnaya Mekhanika, vol. 8, No. 6, Jun. 1972, pp. 3-17.

M.F. Henry et al., An investigation of switching stresses in bimetal disks, International Journal of Mechanical Science, Pergamon Press, vol. 14, 1972, pp. 343-358.

B.D. Aggarwala et al., Thermal stability of bimetallic shallow spherical shells, International Journal of Non-Linear Mechanics, vol. 5, Pergamon Press 1970. pp. 49-62.

W.H. Wittrick et al., Stability of a bimetallic disk, Quarterly Journal of Mechanics and Applied Mathematics, vol. VI, Pt 1, 1953, pp. 15-31.

* cited by examiner

SELF-REGULATING BIMETALLIC DIAPHRAGM PUMP

CROSS REFERENCE TO RELATED APPLICATIONS

This application claims priority from U.S. Provisional Patent Application No. 62/899,728 filed on 12 Sep. 2019 and entitled "Self-Regulating Bimetallic Diaphragm Pump," which is incorporated herein by reference in its entirety for all purposes.

FIELD OF THE DISCLOSURE

The present disclosure relates generally to fluid handling systems, and more particularly, to methods and systems for using a bi-metal diaphragm pump to commute fluid between hot and cold fluid reservoirs and more particularly for pumping fluids in environments where application of conventional power sources is limited and there exists an abundance of low grade thermal energy such as a source of waste heat.

SUMMARY

In at least one implementation, the disclosed inventions include a diaphragm pump for fluid handling systems. The diaphragm pump includes two rigid walls to form a cavity composed of a single conjoined chamber. The single conjoined chamber is divided by a snap-acting, bimetallic disk diaphragm. The bimetallic disk diaphragm is fastened on opposite sides of a flexible diaphragm which uses the rapid, concavity inversing, buckling transition of a bimetallic shell to produce a pumping movement utilizing the conversion of thermal energy in a first fluid stream to mechanical energy in a first and second fluid in a cyclical process in which the bimetal shell moves from a concave position overlying the curvature of the first chamber to a convex position overlying the curvature of the second chamber in a continuing reciprocating action. Two sets of inlet and outlet passageways use one way valves to control the flow of two separate fluids, externally maintained at different temperatures, are configured to each opposed pump chamber such that the thermally responsive displacement of the diaphragm induced by the exchange of thermal energy with one pump fluid induces the sequential exchange of thermal energy with the other pump fluid yielding a mechanical process which requires no external power source other than the thermal gradient between two fluids. As such, the disclosed inventions provide a novel system, method and apparatus for the conversion of thermal energy to mechanical work.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Figure 1A:
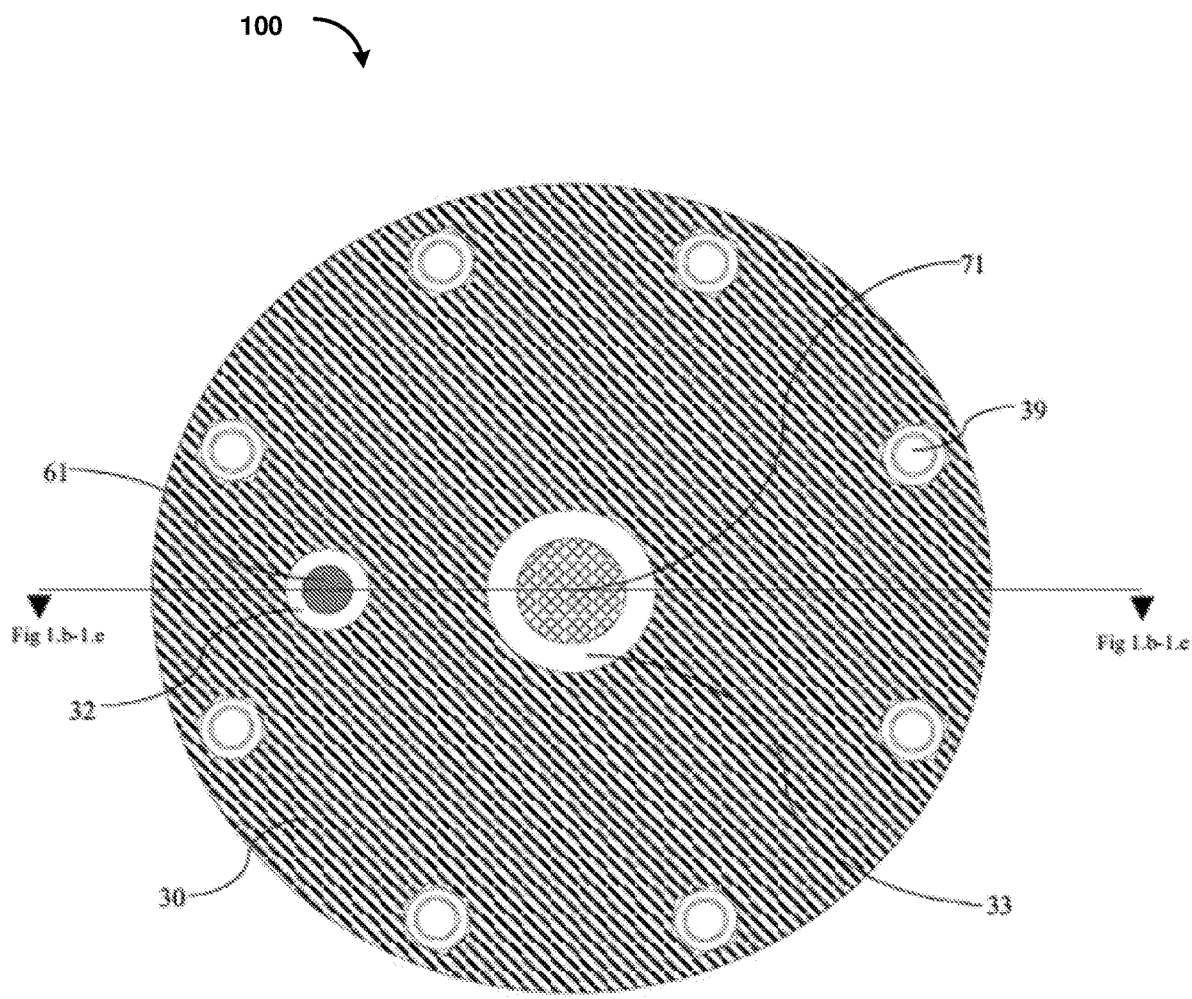
FIG. 1A is a top view of the pump, for implementing embodiments of the present disclosure.

Several exemplary embodiments for bimetal diaphragm pump systems and methods will now be described. It will be apparent to those skilled in the art that the present disclosure may be practiced without some or all of the specific details set forth herein.

Diaphragm pumps use a flexible membrane as a mechanical pump diaphragm. The mechanical pump diaphragm can be displaced to change the volume of a pump chamber to produce a positive displacement of a fluid. Typical diaphragm pumps use an external energy source to move the mechanical pump diaphragm. The external energy source can be a mechanical actuator, an electrical actuator or a heating element.

Differential thermal expansion of a bimetal element can be used directly motivate the flow of fluid. However, typical implementations of pumps using differential thermal expansion of a bimetal element are expensive, complex assemblies with many moving parts, each part subject to wear and degradation.

The disclosed bimetal diaphragm pump systems and methods avoid these complications as the mechanical pump diaphragm and directional control valves are the only moving components. The disclosed mechanical pump diaphragm operation is powered exclusively by a thermal gradient across the pump fluids. A single mechanical pump diaphragm is used to pump both warmer and cooler fluids thus the movement of the mechanical pump diaphragm to clear one chamber loads or draws fluid into the other chamber in a reciprocating operation, allowing for cyclical operation of the disclosed bimetal diaphragm pump. In one implementation, the mechanical pump diaphragm uses a thermostatic bimetal as the mechanical pump diaphragm.

In at least one implementation, the contraction of the disclosed mechanical pump diaphragm is motivated by the differential thermal expansion of the bimetal caused by the transfer of thermal energy between the pump fluid and the mechanical pump diaphragm rather than by use of electrically induced resistive heating or other sources of thermal energy. As such, the disclosed bimetal diaphragm pump systems and methods convert thermal energy from the pump fluid to mechanical energy in the pump fluid, using the pump fluid as a working fluid.

The disclosed bimetal diaphragm pump systems and methods includes two separated pump chambers on opposing sides of the mechanical pump diaphragm so that each chamber can be alternately, substantially filled and substantially cleared to produce a substantially continuous, reciprocating action.

In at least one implementation, the disclosed bimetal diaphragm pump systems and methods include a self-actuated diaphragm pump including a mechanical pump diaphragm. The bimetal mechanical pump includes a thermally-responsive bimetal mechanical pump diaphragm, sealed between two rigid pump chamber walls so as to form a single cavity having a fixed net volume. The single, fixed net volume cavity is divided into separate first pump chamber and second pump chamber by the bimetal mechanical pump diaphragm. Each of the first and second pump chamber includes corresponding inlet and outlet ports. Each of the corresponding inlet and outlet ports are coupled to respective one-way check valves. Each of the corresponding inlet and outlet ports are coupled to and in fluid communication with respective inlet and outlet channels.

In operation, a first fluid is coupled to the first pump chamber from a relatively low temperature fluid reservoir and a second fluid is coupled to the second pump chamber from a relatively high temperature fluid reservoir so that the exchange of thermal energy between the first and second fluids and the diaphragm can be translated to mechanical work and thus the pump fluid is also a working fluid. Under certain conditions, the respective high temperature fluid reservoir and low temperature fluid reservoir may actually be the same or different types and forms of fluid, from two different sources (e.g., reservoirs or other fluid sources) if there exists a sufficient temperature gradient between the first and second fluids, in the respective inlet channels. The sufficient temperature gradient between the first fluid and the second fluid includes a low temperature fluid has a temperature cooler than a lower buckling temperature of the bimetal mechanical pump diaphragm and the high temperature fluid has a temperature higher than a higher buckling temperature of the bimetal mechanical pump diaphragm.

In at least one implementation, the bimetal mechanical pump diaphragm can be stress treated such that it holds a thermally-dependent curvature that substantially conforms to an inner shape of the pump chamber walls, at the corresponding temperatures and is imparted with adequate initial curvature for thermally-induced elastic buckling transitions characteristic of bimetallic disks to occur. The bimetal mechanical pump diaphragm can be configured to include a high thermal expansion alloy layer on a first surface of the mechanical pump diaphragm and a low thermal expansion alloy layer on an opposing, second surface of the bimetal mechanical pump diaphragm.

The disclosed bimetal diaphragm pump systems and methods can be configured so that the high thermal expansion alloy layer contacts the higher temperature working fluid and the low thermal expansion alloy layer contacts the lower temperature working fluid, with the rigid walls of each pump chamber sealed along the perimeter of the bimetal mechanical pump diaphragm so that an increase in the temperature the bimetal mechanical pump diaphragm results in a deflection of the bimetal mechanical pump diaphragm towards the pump chamber wall of the high temperature fluid pump chamber, thus reducing the volume of the high temperature fluid and increasing the volume of the low temperature fluid pump chamber. Similarly, a decrease in the temperature the bimetal mechanical pump diaphragm results in a deflection towards the pump chamber wall of the low temperature fluid pump chamber, thus decreasing the volume of the low temperature fluid pump chamber and increasing the volume of the high temperature working fluid pump chamber. As a result, the disclosed bimetal diaphragm pump systems and methods can alternately and intermittently siphon and expel the two pump fluids of varying temperature.

If the bimetal mechanical pump diaphragm does not have sufficient initial curvature, the diaphragm can act as a thermal actuator in which the fluid flow is allowed through the disclosed bimetal diaphragm pump system may be determined by the temperature and relative pressures of the first and second fluids and significant mechanical displacement of the fluids, as caused by the movement of the bimetal mechanical pump diaphragm may be induced by temperature fluctuations of the first and second fluid in the respective pump chambers.

FIGS. 1A-1E show an embodiment of a thermally powered, self-regulating bimetallic diaphragm pump, hereafter referred to as a bimetallic diaphragm pump 100. The bimetallic diaphragm pump 100 which can be used in fluid handling systems utilizing a thermal gradient between two fluid sources to perform mechanical displacement of both fluids. The two fluid sources are externally maintained at different temperatures. The bimetallic diaphragm pump 100 includes a bimetal mechanical pump diaphragm 20 in the form of a circular section of a thermostatic bimetal molded to a spherical shell and includes two or more layers 21, 22 of joined metal alloys, each of the metal alloys 21, 22 possessing respective, differing coefficients of thermal expansion. The bimetal mechanical pump diaphragm 20 is thermally stress treated with a sufficient initial curvature so as to exhibit a temperature-dependent elastic buckling transition. When a temperature of the bimetal mechanical pump diaphragm 20 is raised to a sufficiently high temperature, hereafter referred to as an upper transition temperature, the bimetal mechanical pump diaphragm 20 will rapidly invert its concave curvature to a substantially opposite shaped, convex curvature. The elastic buckling motion of the bimetal mechanical pump diaphragm 20 occurs in a time span on the order of about $1 \times 10^{-2}$ seconds in the ambient atmosphere.

When a temperature of the bimetal mechanical pump diaphragm 20 is lowered to a sufficiently low temperature, hereafter referred to as a lower transition temperature, the bimetal mechanical pump diaphragm will rapidly invert its convex curvature to a substantially opposite shaped concavity curvature. As a result, a displacement of the center 20A of bimetal mechanical pump diaphragm 20, relative to the perimeter 20B of the bimetal mechanical pump diaphragm, exhibits a temperature dependent hysteresis.

The bimetal mechanical pump diaphragm 20 is enclosed between a first rigid pump chamber wall 30 and a second rigid pump chamber wall 40 which form a pump housing and conjoined to form a single pump cavity 102. Hereafter, the distinctions upper and lower in reference to pump housing sections is defined relative to the orientation of the apparatus in FIGS. 1A-1E. This convention is solely used for descriptive purposes and does not convey a necessary orientation for pump operation. In at least one implementation, the outer circumferential edge of the bimetal mechanical pump diaphragm 20, sealing system 51, 52 forms a seal between the rigid pump chamber walls 30 and 40. The sealing system 51, 52 can include one or more elastomeric O-rings, or similar flat, elastomeric and other non-elastomeric sealing mechanisms such as gaskets and mechanical crush sealing systems or any other suitable sealing system.

The bimetal mechanical pump diaphragm 20 is configured such that the high thermal-expansion alloy side 21 may only come in contact with the high temperature working fluid and the low thermal-expansion alloy side 22 may only contact the low temperature working fluid.

An inlet passage 32 through rigid pump chamber wall 30 is supplied with a relatively high temperature fluid from a first reservoir 103. An inlet passage 42, through rigid pump chamber wall 40, is supplied with a relatively low temperature fluid from a second reservoir 104.

Figure 1B:
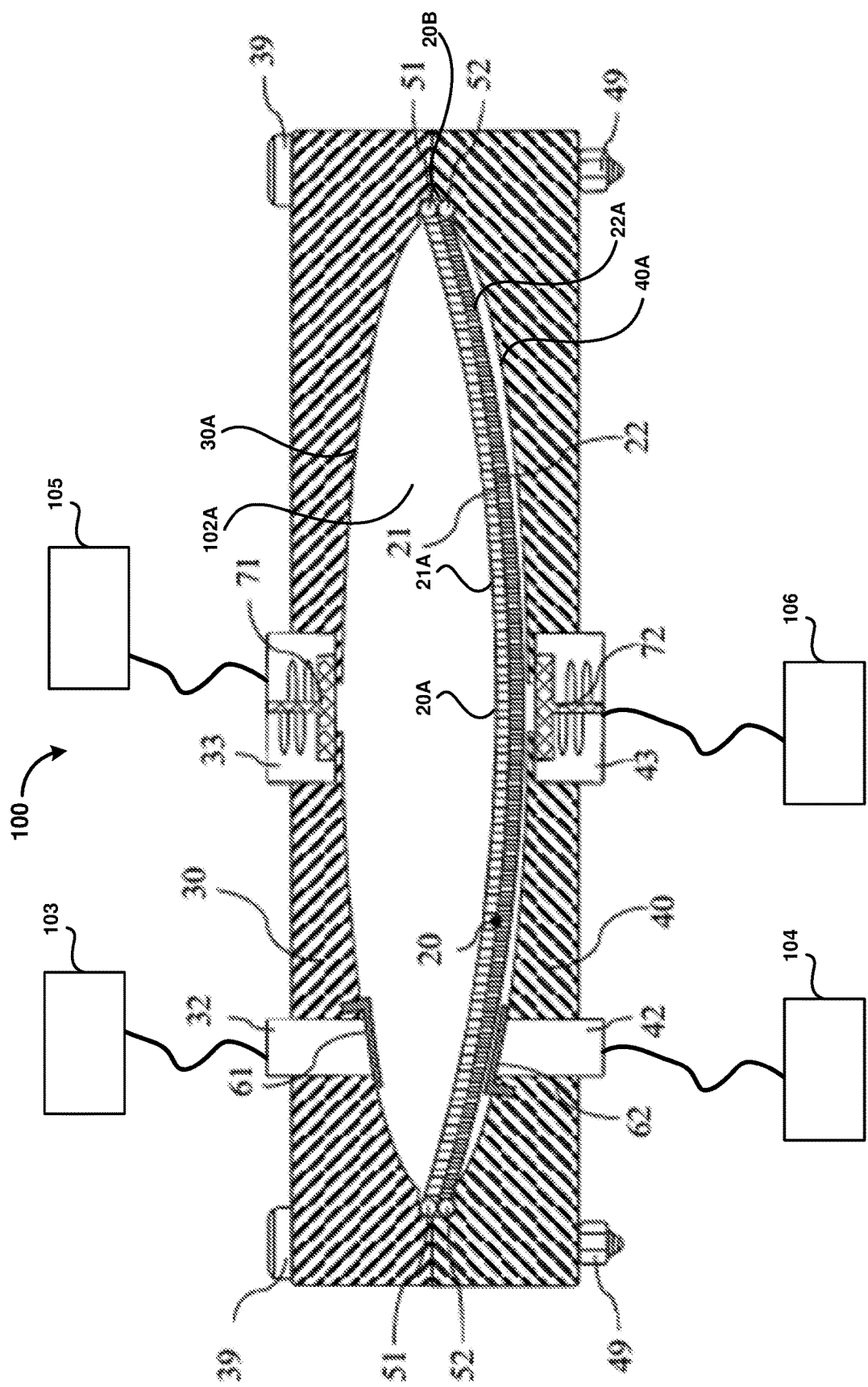
FIG. 1B is a cross-section view of the pump in a first at rest position with the diaphragm displaced so that the high temperature working pump fluid chamber is filled and thermal energy is being transferred to the diaphragm from the fluid, for implementing embodiments of the present disclosure.

The bimetal mechanical pump diaphragm 20 is shown in FIG. 1B in a first configuration, in which the curvature of the bimetal mechanical pump diaphragm substantially conforms to the interior wall 40A of the rigid pump chamber wall 40 with the lower surface 22A of the bimetal mechanical pump diaphragm in close proximity with the surface 40A of rigid pump chamber wall 40.

The upper inlet passage 32 through rigid pump chamber wall 30 is blocked by a check valve 61. The upper inlet passage 32 is fluidly coupled to the first, higher temperature reservoir 103. An outlet passage 33 through rigid pump chamber wall 30 is blocked by a spring check valve 71.

The lower inlet passage 42 through rigid pump chamber wall 40 is blocked by a check valve 62. The lower inlet passage 42 is fluidly coupled to the second, lower temperature reservoir 104. An outlet passage 43 through rigid pump chamber wall 40 is blocked by a spring check valve 72.

In the configuration shown in FIG. 1B, the upper pump cavity 102A is initially filled with high temperature fluid from reservoir 103. As thermal energy is transferred from the hot working fluid to the high thermal-expansion alloy side 21 of the bimetal mechanical pump diaphragm 20, the differential rates of thermal expansion of the bimetal alloys 21, 22 result in the accumulation of mechanical stresses in the bimetal mechanical pump diaphragm.

Figure 1C:
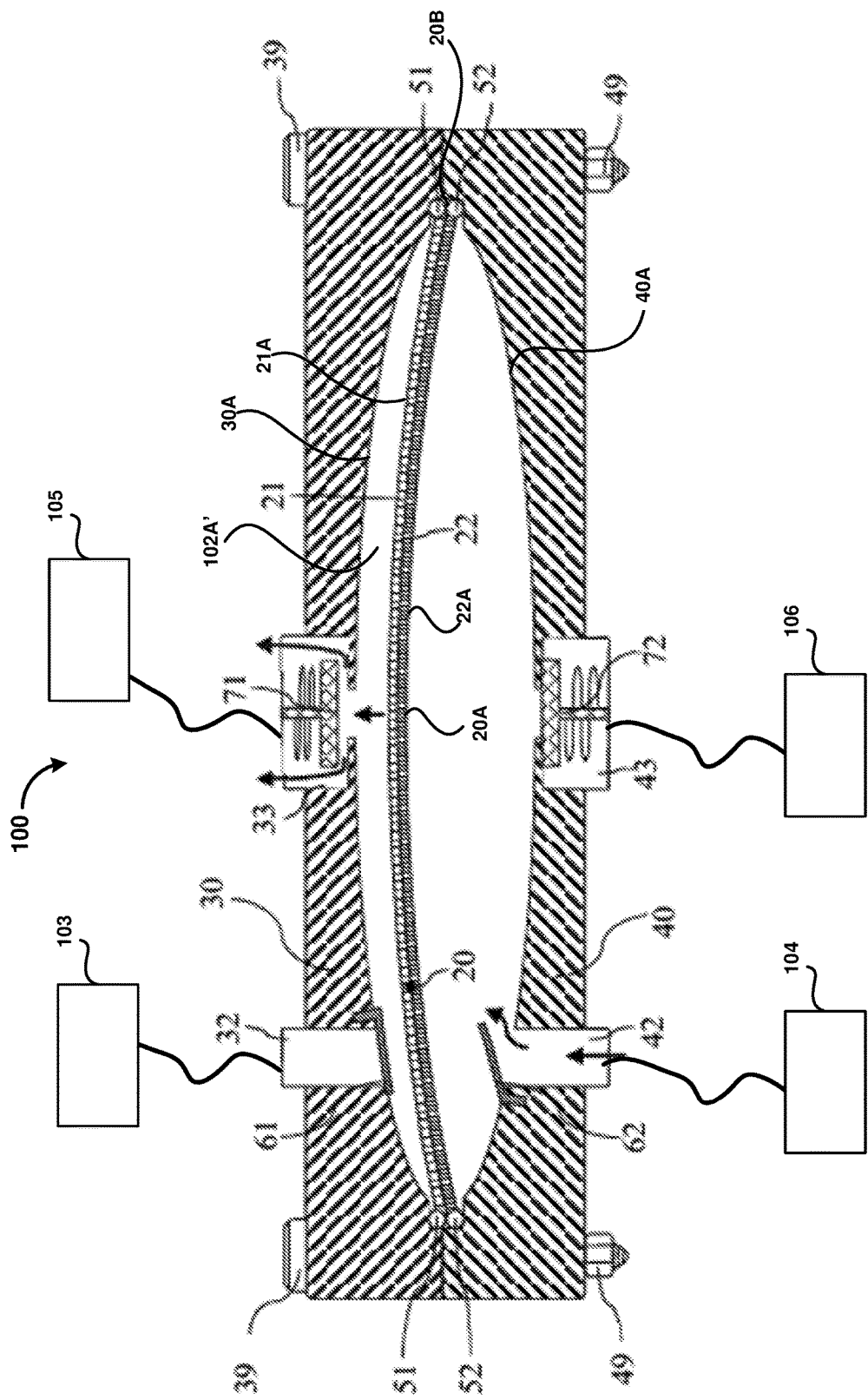
FIG. 1C is a cross-section view of the pump during the elastic buckling transition of the bimetallic disk producing the displacement of the diaphragm from a first rest position shown in FIG. 1B to a second rest position shown in FIG. 1D, for implementing embodiments of the present disclosure.

With sufficient temperature change, the bimetal mechanical pump diaphragm 20 reaches an instability condition in which elastic buckling of the bimetal mechanical pump diaphragm occurs as illustrated in FIG. 1C. The bimetal mechanical pump diaphragm 20 undergoes a deformation that results in a rapid inversion of the curvature of the bimetal mechanical pump diaphragm 20 so that the curvature of the bimetal mechanical pump diaphragm substantially inverts to substantially conform to the interior surface 30A of the rigid pump chamber wall 30, in a second alternate resting position, as shown in FIG. 1D.

Figure 1D:
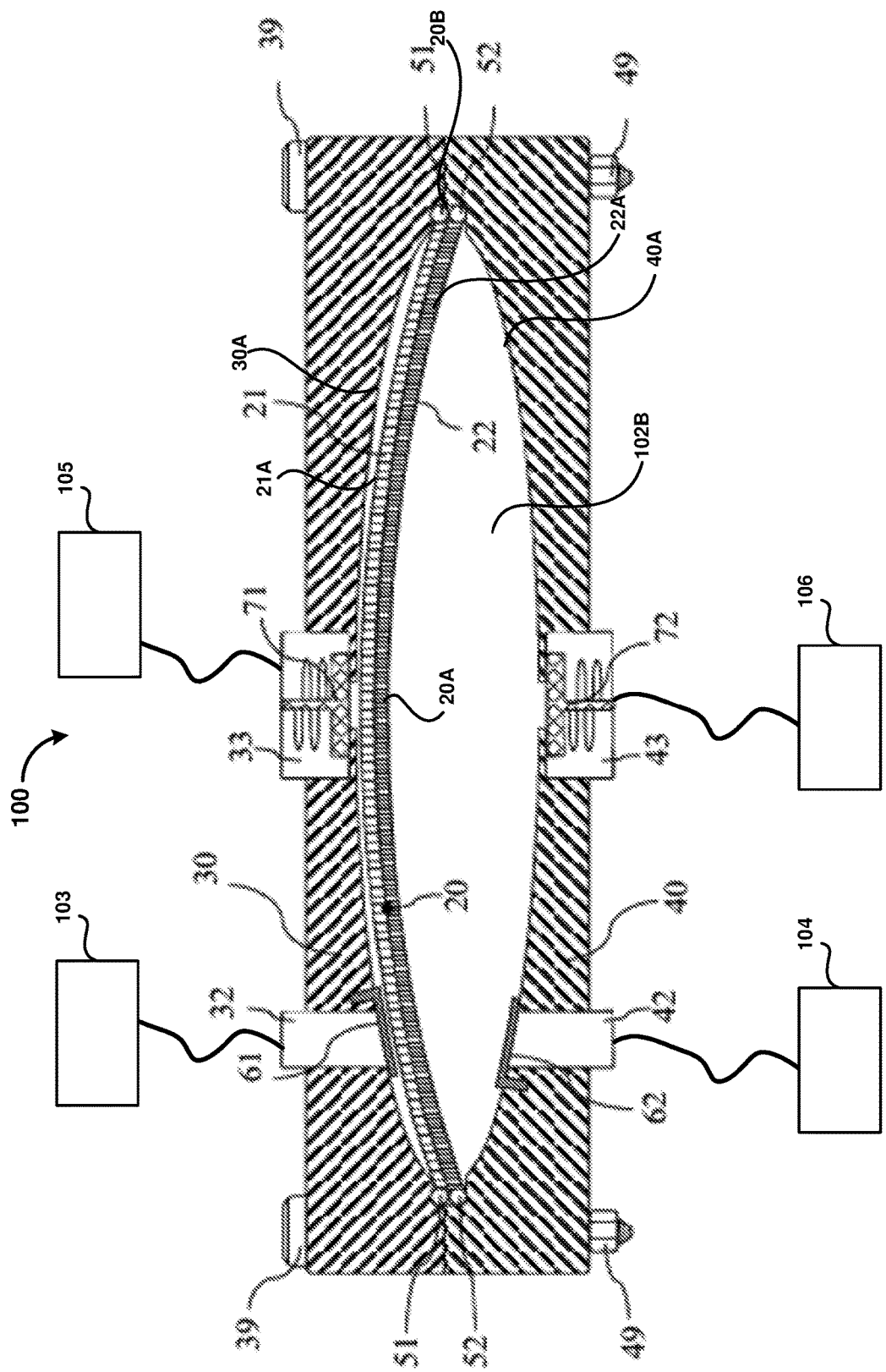
FIG. 1D is a cross-sectional view of the pump in its second at rest position with the diaphragm displaced so that the low temperature working pump fluid chamber is filled and subsequently thermal energy is being transferred from the bimetallic disk to the low temperature fluid, for implementing embodiments of the present disclosure.

As the thermally induced displacement of the bimetal mechanical pump diaphragm 20 transitions, the pump from the configuration shown in FIG. 1B to the configuration shown in FIG. 1D, the volume of the upper pump cavity 102A' enclosed by rigid pump chamber wall 30 and the upper surface 21A of the bimetal mechanical pump diaphragm is decreased creating an increase in pressure that acts on the plunger of spring-loaded check valve 71 causing the valve 71 to open and allowing for the expulsion of the higher temperature fluid from the upper pump cavity 102A to flow through the outlet port 33.

Simultaneously, the volumetric increase of the lower pump cavity 102B enclosed by rigid pump chamber wall 40 and the bimetal mechanical pump diaphragm 20, produces a decrease in pressure causing valve 62 to open allowing lower temperature working fluid to be drawn in to the lower pump cavity 102B, from the second reservoir 104.

In the configuration shown in FIG. 1D the lower pump cavity 102B is filled with low temperature fluid from second reservoir 104. As thermal energy is transferred from the low temperature fluid to the low thermal-expansion alloy side 22 of the bimetal mechanical pump diaphragm 20, the differential rates of thermal expansion of the bimetal alloys 21, 22 result in the accumulation of mechanical stresses in the bimetal mechanical pump diaphragm.

Figure 1E:
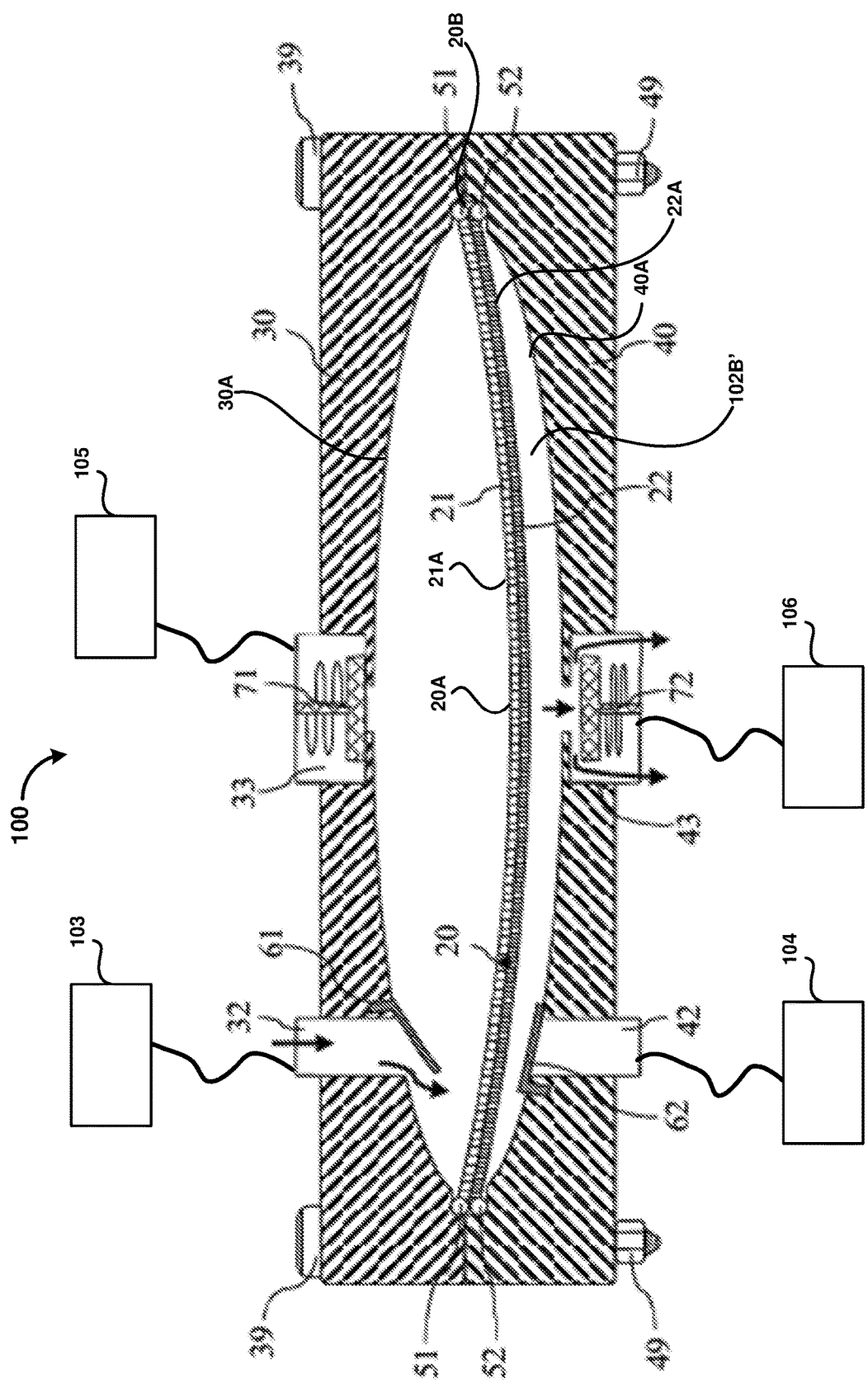
FIG. 1E is a cross-section view of the pump during the elastic buckling transition that is inverse to that of FIG. 1C whereby the diaphragm transitions from the second rest position shown in FIG. 1D to the first rest position shown in FIG. 1B, for implementing embodiments of the present disclosure.

With sufficient temperature change, the bimetal mechanical pump diaphragm 20 reaches an instability condition in which elastic buckling of the bimetal mechanical pump diaphragm occurs as is illustrated in FIG. 1E. The bimetal mechanical pump diaphragm 20 undergoes a deformation that results in a rapid inversion of the curvature of the bimetal mechanical pump diaphragm 20 so that the curvature of the bimetal mechanical pump diaphragm inverts to substantially conform to the interior surface 40A of the rigid pump chamber wall 30, in the first resting position as is shown in FIG. 1B.

As the thermally induced displacement of the bimetal mechanical pump diaphragm 20 transitions, the pump from the configuration shown in FIG. 1D to the configuration shown in FIG. 1B, the volume of the lower pump cavity 102B', enclosed by rigid pump chamber wall 40 and the lower surface 22A of the bimetal mechanical pump diaphragm, is decreased creating an increase in pressure that acts on the plunger of spring-loaded check valve 72 causing the valve to open and allowing for the expulsion of the lower temperature fluid from the lower pump cavity 102B to flow through the outlet port 43. Simultaneously, the volumetric increase of the upper pump cavity 102A, enclosed by rigid pump chamber wall 30 and the bimetal mechanical pump diaphragm 20, produces a decrease in pressure causing check valve 61 to open allowing higher temperature fluid to be drawn into the pump, through check valve 61, from the first reservoir 103, and the process described in FIGS. 1B-1E above, repeats in a reciprocating pattern.

The system 100 may include various modifications without exceeding the scope of the principal novelty of the invention. Pump performance may benefit from the implementation of various kinds of valves or use of certain materials as a known by those skilled in the art. In at least one implementation, one or more of the valves 61, 62, 71, 72 on the corresponding inlet and outlet ports of the rigid pump chamber walls 30, 40, may be electronically actuated and may be controlled in conjunction with temperature sensing elements in various regions of the system 100.

In at least one implementation, one or more portions of the rigid pump chamber walls 30, 40 may include one or more types of highly thermally insulative materials to minimize waste heat flow through the pump 100.

In at least one implementation, the bimetal mechanical pump diaphragm 20 can be formed from any of suitable materials that convert changes in temperature to mechanical strain and combinations of such materials. The curvature of the bimetal mechanical pump diaphragm 20 can be forcibly saddled to modify one or both of the upper and lower transition temperatures at which change in shape transitions occur.

Elastic buckling of the bimetal mechanical pump diaphragm 20 may be catalyzed or impeded by supplemental mechanisms such as mechanical agitation or pressure pulses in one or more of the reservoirs 103, 104, 105, 106. Because a bimetal mechanical pump diaphragm 20 can be inexpensively fabricated for operations at specified temperature ranges with a relatively small deviation between upper and lower transition temperatures without necessitating thick bimetallic material, and is highly resilient to fatigue failures the apparatus can be constructed without special materials, resulting in reduced inventory costs for manufacture. The bimetal mechanical pump diaphragm 20 may also utilize shape memory alloys. The bimetal mechanical pump diaphragm 20 and the rigid pump chamber wall 30, 40 can be formed in any suitable shapes. The fluids used can be any suitable chemical compositions, pressure and temperature. In at least one implementation, the fluids have a high conductivity, a high specific heat capacity, and low viscosity. For a non-limiting example, a propylene glycol water solution may be used as the higher temperature fluid and a saltwater solution may be used as the lower temperature fluid.

The pump 100 can operate at elevated system pressures providing an increased operable temperature range for the fluids, thus resulting in larger threshold temperature differences and higher energy output. The pump 100 can include any suitable priming mechanisms, such as a non-limiting example of electrical connections to the bimetal mechanical pump diaphragm 20, such that electrical current flow through the bimetal mechanical pump diaphragm creates resistance heating of the diaphragm to cause the initial drawing in of fluid to begin the cycle of the pump.

In at least one implementation the bimetal mechanical pump diaphragm 20 can be made with a high temperature expansion layer 21 with a composition of about 22 percent Nickel, about 3 percent Chromium and the remainder Iron and a low temperature expansion layer 22 with a composition of about 36 percent Nickel and the remainder Iron, and a radius of about 76 mm and a thickness of about 0.3 mm fitted to a spherical cap of a sphere with a radius of about 700 mm provided a low buckling temperature at about 32 degrees C. and a high buckling temperature at about 46 degrees C. (e.g., a ΔT of about 14 degrees C.) and was in a pressure between about $5\times10^3$ Pascals and about $10\times10^3$ Pascals at the respective high and low buckling temperatures.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A diaphragm pump for the conversion of thermal energy in a first fluid to mechanical energy in a first fluid and second fluid comprising:
    a first pump chamber wall having a first concave shape;
    a second pump chamber wall having a second concave shape, the first pump chamber wall secured to the first pump chamber wall, the first concave shape being opposite the second concave shape, the first concave shape and the second concave shape forming a pump cavity, the pump cavity including:
    a first pump chamber;
    a second pump chamber; and
    a bimetal mechanical pump diaphragm disposed between the first pump chamber and the second pump chamber, the bimetal mechanical pump diaphragm including a low thermal expansion alloy layer and a high thermal expansion alloy layer, the bimetal mechanical pump diaphragm having an outer edge, the outer edge being sealed between the first pump chamber wall and the second pump chamber wall;
    a first directional inlet valve in fluid communication with the first pump chamber, the first directional inlet valve coupled to a first quantity of fluid having a first temperature greater than a high buckling temperature of the high thermal expansion alloy layer;
    a first directional outlet valve in fluid communication with the first pump chamber;
    a second directional inlet valve in fluid communication with the second pump chamber the second directional inlet valve coupled to a second quantity of fluid having a second temperature less than a low buckling temperature of the low thermal expansion alloy layer, wherein the low buckling temperature is less than the high buckling temperature; and
    a second directional outlet valve in fluid communication with the second pump chamber.

2. The pump of claim 1, wherein the first directional inlet valve allows a portion of the first quantity of fluid to flow into the first pump chamber and the first directional outlet valve allows the portion of the first quantity of fluid to flow out of the first pump chamber.

3. The pump of claim 2, wherein the high thermal expansion alloy layer faces the first concave shape and the bimetal mechanical pump diaphragm buckles into the first pump chamber when the portion of the first quantity of fluid flows into the first pump chamber.

4. The pump of claim 1, wherein the second directional inlet valve allows a portion of the second quantity of fluid to flow into the second pump chamber and the second directional outlet valve allows the portion of the second quantity of fluid to flow out of the second pump chamber.

5. The pump of claim 4, wherein the low thermal expansion alloy layer faces the second concave shape and the bimetal mechanical pump diaphragm buckles into the second pump chamber when the portion of the second quantity of fluid flows into the second pump chamber.

6. The pump of claim 1, wherein at least one of the first outlet port and the second outlet port is disposed centrally in the corresponding first pump chamber wall and second pump chamber wall.

7. The pump of claim 1, wherein at least one of the first inlet port and the second inlet port is disposed annularly around corresponding first outlet port and second outlet port.

8. The pump of claim 1, wherein the pump cavity has a shape of at least one of a cylindrical shape, a conical shape, an elliptic shape or a parabolic shape.

9. A diaphragm pump comprising:
    a first pump chamber wall;
    a second pump chamber wall forming a pump cavity, the pump cavity including:
    a first pump chamber;
    a second pump chamber; and
    a bimetal mechanical pump diaphragm disposed between the first pump chamber and the second pump chamber, the bimetal mechanical pump diaphragm including:
    a low thermal expansion alloy layer having a low buckling temperature;
    a high thermal expansion alloy layer having a high buckling temperature, wherein the low buckling temperature is less than the high buckling temperature;
    an outer edge, the outer edge being sealed between the first pump chamber wall and the second pump chamber wall;
    a first quantity of fluid selectively coupled to the first pump chamber, the first quantity of fluid having a first temperature greater than a high buckling temperature of the high thermal expansion alloy layer; and a second quantity of fluid selectively coupled to the second pump chamber, the second quantity of fluid having a second temperature less than a low buckling temperature of the low thermal expansion alloy layer.

10. A method of pumping fluid with a bimetal mechanical diaphragm pump comprising:

drawing a first fluid into a first pump chamber, the first fluid having a first temperature greater than a high buckling temperature of a high thermal expansion alloy layer of a bimetal mechanical pump diaphragm disposed in the bimetal mechanical diaphragm pump, wherein the bimetal mechanical pump diaphragm also includes a low thermal expansion alloy layer, wherein the low thermal expansion alloy layer has a low buckling temperature, the low buckling temperature being less than the high buckling temperature;

buckling the bimetal mechanical pump diaphragm into the first pump chamber; and pushing the first fluid out of the first pump chamber when the bimetal mechanical pump diaphragm buckles into the first pump chamber.

11. The method of claim 10, further comprising:

drawing a second fluid into a second pump chamber as the bimetal mechanical pump diaphragm buckles into the first pump chamber, the second fluid having a second temperature less than the low buckling temperature of the low thermal expansion alloy layer of the bimetal mechanical pump diaphragm;

buckling the bimetal mechanical pump diaphragm into the second pump chamber; and pushing the second fluid out of the second pump chamber when the bimetal mechanical pump diaphragm buckles into the second pump chamber.

\* \* \* \* \*